US009353221B2

(12) United States Patent
Avtomonov et al.

(10) Patent No.: US 9,353,221 B2
(45) Date of Patent: May 31, 2016

(54) CARBODIIMIDATION METHOD

(75) Inventors: Evgeny Avtomonov, Leverkusen (DE);
Harald Kraus, Leverkusen (DE);
Sebastian Dörr, Düsseldorf (DE); Dirk Achten, Leverkusen (DE); Jörg Büchner, Bergisch Gladbach (DE)

(73) Assignee: Covestro Deutschland AG, Leverkusen (DE)

(*) Notice: Subject to any disclaimer, the term of this patent is extended or adjusted under 35 U.S.C. 154(b) by 329 days.

(21) Appl. No.: 13/638,333

(22) PCT Filed: Mar. 28, 2011

(86) PCT No.: PCT/EP2011/054742
§ 371 (c)(1),
(2), (4) Date: Dec. 6, 2012

(87) PCT Pub. No.: WO2011/120928
PCT Pub. Date: Oct. 6, 2011

(65) Prior Publication Data
US 2013/0143458 A1    Jun. 6, 2013

(30) Foreign Application Priority Data
Apr. 1, 2010   (EP) ..................................... 10158927

(51) Int. Cl.
*C08G 18/00*   (2006.01)
*C08G 73/00*   (2006.01)
*C08G 18/09*   (2006.01)
*C08G 18/02*   (2006.01)
*C08G 18/28*   (2006.01)
*C08G 18/79*   (2006.01)
*C09J 7/02*    (2006.01)
*C09J 7/04*    (2006.01)
*D06N 3/14*    (2006.01)

(52) U.S. Cl.
CPC .............. *C08G 73/00* (2013.01); *C08G 18/025* (2013.01); *C08G 18/095* (2013.01); *C08G 18/283* (2013.01); *C08G 18/797* (2013.01); *C09J 7/0239* (2013.01); *C09J 7/041* (2013.01); *D06N 3/14* (2013.01); *C08G 2105/06* (2013.01); *Y10T 428/249921* (2015.04); *Y10T 428/2804* (2015.01); *Y10T 428/2896* (2015.01); *Y10T 442/2738* (2015.04)

(58) Field of Classification Search
CPC .. C08G 18/025; C08G 18/095; C08G 18/797; C08G 2105/06
USPC ............ 528/44, 48, 51, 59, 67, 591, 840, 839
See application file for complete search history.

(56) References Cited

U.S. PATENT DOCUMENTS

| 2,840,589 A | 6/1958 | Smeltz |
| 2,853,473 A | 9/1958 | Campbell et al. |
| 2,941,966 A | 6/1960 | Campbell |
| 4,294,719 A | 10/1981 | Wagner et al. |
| 4,344,855 A | 8/1982 | Schafer et al. |
| 5,354,888 A | 10/1994 | Scholl |
| 5,498,747 A | 3/1996 | Pohl et al. |
| 6,121,406 A * | 9/2000 | Imashiro et al. ............. 528/170 |

FOREIGN PATENT DOCUMENTS

| DE | 2504400 A1 | 8/1976 |
| DE | 2552350 A1 | 5/1977 |
| EP | 628541 B1 | 4/1997 |
| EP | 609698 B1 | 6/1997 |
| EP | 0952146 B1 | 8/2006 |
| WO | WO-2005003204 A3 | 3/2005 |

OTHER PUBLICATIONS

Kurzer, F. and Douraghi-Zadeh, K. Advances in the Chemistry of Carbdoiimides. "Chemical Reviews", 03/27/167, pp. 107-152.*
Campbell, T. et al. Carbodiimides I. Conversion of Isocyanates to Carbodiimides with Phospholine Oxide Catalyst. "Organic and Biological Chemistry." Oct. 5, 1962.*
International Search Report for PCT/EP2011/054742 mailed Oct. 7, 2011.
International Preliminary Report on Patentability for PCT/EP2011/054742 dated Oct. 2, 2012.

* cited by examiner

*Primary Examiner* — Michael L Leonard
(74) *Attorney, Agent, or Firm* — Drinker Biddle & Reath LLP

(57) ABSTRACT

The present invention relates to aqueous dispersions containing hydrophilized polycarbodiimides, methods for producing the aqueous dispersions according to the invention, their use as a constituent of binders in adhesives, lacquers, paints, paper coating compounds or in fiber nonwovens and articles made of wood, metal, textile, leather or plastic, which are treated with the aqueous dispersion according to the invention.

11 Claims, No Drawings

CARBODIIMIDATION METHOD

CROSS-REFERENCE TO RELATED APPLICATIONS

This application is a national stage application (under 35 U.S.C. §371) of PCT/EP2011/054742, filed Mar. 28, 2011, which claims benefit of European Application No. 10158927.3, filed Apr. 1, 2010, both of which are incorporated herein by reference in their entirety.

The present invention relates to polycarbodiimides and a method for their production, in particular aqueous dispersions containing hydrophilized polycarbodiimides, methods for producing the aqueous dispersions according to the invention, their use as a constituent of binders in adhesives, lacquers, paints, paper coating compounds or in fibre nonwovens and articles or composites made for example of wood, metal, textile, leather and/or plastic, which are treated with the aqueous dispersion according to the invention.

Generally considered, carbodiimide groups can be obtained in a straightforward way from two isocyanate groups by elimination of carbon dioxide:

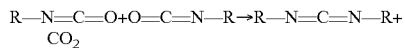

Starting from diisocyanates, it is thus possible to obtain oligomer compounds having a plurality of carbodiimide groups and optionally isocyanate groups, in particular terminal isocyanate groups, so-called polycarbodiimides. The isocyanate groups still remaining can be reacted further, for example with alcohols, thiols, primary or secondary amines to form urethane, thiourethane or urea groups. Besides free isocyanate groups, the polycarbodiimides can therefore also contain their aforementioned reaction products.

The production of polycarbodiimides from diisocyanates is known per se, and is described for example in U.S. Pat. No. 2,840,589, U.S. Pat. No. 2,853,473, U.S. Pat. No. 2,941,966 and EP-A 628541. A feature common to all customary methods nowadays is that phosphorus compounds are used as catalysts (carbodiimidation catalysts), such as various phospholene oxides, for example 1-methyl-2 (and/or 3)-phospholene-1-oxide, 3-methyl-2 (and/or 3)-phospholene-1-oxide, 1-phenyl-2 (and/or 3)-phospholene-1-oxide, 1-phenyl-3-methyl-2 (and/or 3)-phospholene-1-oxide and 1-ethyl-2 (and/or 3)-phospholene oxide. These catalysts usually remain in the products. Polycarbodiimides can also be produced particularly well and free from byproducts by catalysis according to DE-A 2 504 400 and DE-A 2 552 350. In this case, phospholene oxides are introduced into a matrix which is insoluble in carbodiimide and, after the carbodiimidation, removed from the reaction mixture. EP-A 609698 discloses a method for producing carbodiimides, in which $CO_2$ is introduced into the reaction mixture at the end of the reaction in order to remove the catalyst from the product. The carbodiimidation of diisocyanates in the presence of catalysts such as phospholene oxide is already well known. It is also known that aromatic isocyanates can be converted into carbodiimides under much milder reaction conditions and with smaller amounts of phospholene oxide catalyst (in this regard, see for example T. W. Campbell et al. in J. Am. Chem. Soc., 84, (1962), 3673-3677). While phospholine oxide catalyst amounts of sometimes much less than 0.1 wt. % and temperatures <170° C. are often sufficient for the reaction of aromatic isocyanates, the carbodiimidation of aliphatic and cycloaliphatic isocyanates requires temperatures of around 180° C. and phospholene oxide catalyst amounts of the order of 0.5 wt. %, as taught for example in EP-A 952146 and WO-A 2005/003204. In particular isocyanate compounds, for example di-4,4'-diisocyanatocyclohexylmethane, isophorone diisocyanate etc., which have secondary isocyanate groups, react slowly and require sizeable amounts of carbodiimidation catalysts.

Phosphorus organyls, including inter alia phospholene oxides, are toxic and very expensive compounds. The use of sizeable amounts of phospholene oxide as a catalyst can therefore lead to the synthesis of the polycarbodiimide being uneconomical and furthermore associated with health and safety problems.

It is therefore an object of the present invention to provide an efficient method for producing aqueous dispersions of aliphatic and cycloaliphatic polycarbodiimides, which makes it possible to produce the polycarbodiimide in a short time with small amounts of catalyst.

The aforementioned object is achieved by the subject-matter of the present invention.

The present invention firstly provides a method for producing polycarbodiimide, wherein, in at least one step, at least one aliphatic or cycloaliphatic polyisocyanate is converted at a temperature in the range of from 160 to 230° C. in the presence of from 50 to 3000 ppm (ppm=part per million, 1 ppm=0.0001%, molar proportions) of carbodiimidation catalyst, expressed in terms of the molar amount of polyisocyanate, into a polycarbodiimide having an average functionality of from 1 to 10 carbodiimide units, the reaction gases being periodically or continuously removed from the reaction medium in a controlled way.

In the context of the present invention, the average carbodiimide unit functionality means the average number of carbodiimide units. The average functionality may also be a fractional number. The average functionality is from 1 to 10, preferably from 2 to 7. If the average functionality is more than 10, the dispersibility of the hydrophilized polycarbodiimide in water is low.

In the context of the present invention, a reaction gas refers to a gaseous compound which is formed during the carbodiimidation of polyisocyanates. The reaction gas predominantly consists of carbon dioxide.

In the context of the present invention, controlled removal of the reaction gases from the reaction medium is intended to mean extracting the reaction gases by applying a vacuum or expelling the reaction gases with the aid of inert gases. Nitrogen and noble gases, or a mixture thereof, are preferred when using inert gases. A combination of the two method features is also possible, by applying a vacuum and supplying inert gas. This may be done simultaneously or alternately.

An aliphatic or cycloaliphatic polyisocyanate is preferably selected from the group consisting of methylene diisocyanate, dimethylene diisocyanate, trimethylene diisocyanate, tetramethylene diisocyanate, pentamethylene diisocyanate, dipropylether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropylether diisocyanate, thiodihexyl diisocyanate, metaxylylene diisocyanate, paraxylylene diisocyanate, tetramethylxylylene diisocyanate, 4,4'-dicyclohexylmethane diisocyanate (H12MDI), isophorone diisocyanate (IPDI), hexamethylene diisocyanate (HDI), hydrogenated xylylene diisocyanate ($H_6XDI$), 1,12-diisocyanatododecane (DDI), norbornane diisocyanate (NBDI) and 2,4-bis(8-isocyanatooctyl)-1,3-dioctylcyclobutane (OCDI).

Isophorone diisocyanate (IPDI), hexamethylene diisocyanate (HDI), hydrogenated xylylene diisocyanate ($H_6XDI$), 4,4'-dicyclohexylmethane diisocyanate (H12MDI) are particularly preferred. The cycloaliphatic polyisocyanate 4,4'-dicyclohexylmethane diisocyanate (H12MDI) is more particularly preferred.

The carbodiimidation catalyst is preferably an organophosphorus compound, particularly preferably organophosphorus compounds selected from the group consisting of phosphane oxide, phospholane oxide and phospholene oxide, and sulfo and imino analogues thereof. The phosphane, phospholene and phospholane oxides, sulfides and imino derivatives may inter alia be generated in situ from corresponding precursors comprising trivalent phosphorus, such as phosphanes, phospholanes and phospholenes.

The phospholene oxide is preferably selected from the group consisting of 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide.

Likewise suitable carbodiimidation catalysts may be selected from the group consisting of 1-butyl-2-phospholene-1-oxide, 1-(2-ethylhexyl)-2-phospholene-1-oxide, 1-methyl-2-phospholene-1-sulfide, 1-(2-chloroethyl)-2-phospholene-1-oxide, 1-p-tolyl-2-phospholene-1-oxide, 1-1-chloromethyl-2-phospholene-1-oxide, 1,2-dimethyl-2-phospholene-1-oxide, 1-methyl-3-chloro-2-phospholene-1-oxide, 1-methyl-3-bromo-2-phospholene-1-oxide, 1-chlorophenyl-2-phospholene-1-oxide, 1,3,4-trimethyl-2-phospholene oxide, 1,2,4-trimethyl-2-phospholene-1-oxide, 1,2,2-trimethyl-2-phospholene-1-oxide, 1-phenyl-2-phospholen-1-sulfide and 1-phenyl-2,3-dimethyl-2-phospholene-1-oxide. The aforementioned phospholene derivatives may also be present in the pure form or as isomer mixtures with the 2-phospholene isomers.

Likewise suitable carbodiimidation catalysts may also be selected from the group consisting of diphenylphosphinic acid and salts thereof, bis-(2,4,4,-trimethylpentyl)-phosphinic acid, tributylphosphane, triisobutylphosphane sulfide, trialkylphosphane oxides such as trioctylphosphane oxide or trihexylphosphane oxide, triphenylphosphane, tetraphenylphosphine bromide, tetrabutylphosphine chloride, tetrabutylphosphine bromide, bis-(2,4,4-trimethylpentyl)-dithiophosphonic acid and bis-(2,4,4-trimethylpentyl)-monothiophosphonic acid.

The conversion of the polyisocyanate into polycarbodiimide is carried out in the presence of from 50 to 3000 ppm, preferably from 100 to 2000 ppm, particularly preferably in the presence of from 150 to 1000 ppm, more particularly preferably in the presence of from 200 to 700 ppm of carbodiimidation catalyst, expressed in terms of the molar amount of polyisocyanate.

The conversion of the polyisocyanate into polycarbodiimide is carried out at a temperature in the range of from 160 to 230° C., preferably in the range of from 180° C. to 210° C., particularly preferably in the range of from 185° C. to 205° C.

The present invention also provides a method for producing aqueous dispersions of polycarbodiimide, comprising the steps a) converting at least one aliphatic or cycloaliphatic polyisocyanate at a temperature in the range of from 160 to 230° C. in the presence of from 50 to 3000 ppm of carbodiimidation catalyst, expressed in terms of the molar amount of polyisocyanate, into a polycarbodiimide having an average functionality of from 1 to 10 carbodiimide units, the reaction gases being periodically or continuously removed from the reaction medium in a controlled way, b) reacting the polycarbodiimide obtained in step a) with at least one hydrophilic compound which carries at least one group capable of reacting with isocyanate and/or carbodiimide groups, for example but without restriction selected from the group consisting of polyethoxy monools, polyethoxy diols, polyethoxypolypropoxy monools, polyethoxypolypropoxy diols, polyethoxy monoamines, polyethoxy diamines, polyethoxypolypropoxy monoamines, polyethoxypolypropoxy diamines, hydroxyalkyl sulfonates, aminoalkyl sulfonates, polyethoxy mono- and dithiols, polyethoxymono- and dicarboxylic acids, mono- and dihydroxycarboxylic acids or salts thereof, to form a hydrophilized carbodiimide, optionally furthermore reacting the unreacted isocyanate groups with further compounds capable of reacting with isocyanate groups, for example with water, alcohols, thiols, amines, mineral and carboxylic acids, c) dispersing the compound obtained in step b) in water and d) optionally adjusting the aqueous dispersions of hydrophilized polycarbodiimide obtained in step c) to a pH in the range of from 7 to 12.

The reaction of the polycarbodiimide containing isocyanate groups, which is obtained in step a), is preferably carried out according to the invention so that from 10 to 17 molar percent (mol. %) of the isocyanate groups present in the polycarbodiimide are reacted with at least one hydrophilic compound as substep b1) of step b), the hydrophilic compound being selected from the group consisting of polyethoxy monools, polyethoxy diols, polyethoxypolypropoxy monools, polyethoxypolypropoxy diols, polyethoxy monoamines, polyethoxy diamines, polyethoxypolypropoxy monoamines, polyethoxypolypropoxy diamines, hydroxyalkyl sulfonates, aminoalkyl sulfonates, polyethoxy mono- and dithiols, polyethoxymono- and dicarboxylic acids. In substep b2) of step b), 30-90 mol. % of the remaining isocyanate groups are then reacted with at least one compound capable of reacting with isocyanate groups, for example polyethoxy monools, polyethoxy diols, polyethoxypolypropoxy monools, polyethoxypolypropoxy diols, polyethoxy monoamines, polyethoxy diamines, polyethoxypolypropoxy monoamines, polyethoxypolypropoxy diamines, hydroxyalkyl sulfonates, aminoalkyl sulfonates, polyethoxy mono- and dithiols, polyethoxymono- and dicarboxylic acids, water, C1 to C30 alcohols, C1 to C30 thiols, amines, mineral and carboxylic acids.

The reaction of the polycarbodiimide in substep b1) of step b) is preferably carried out with at least one compound selected from the group of compounds corresponding to Formula I:

$$R^1-O-(CH_2-CH_2-O)_m-H \qquad \text{Formula 1}$$

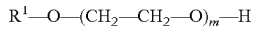

$R^1$=C1 to C30 alkyl, aryl or acyl group m=4 to 60 particularly preferably with at least one compound selected from the group corresponding to Formula 1, where $R^1$ is a methyl group and m=10 to 30.

Monomethoxypolyethylene glycol with m=15-20 is more particularly preferred.

Preferred C1 to C30 alcohols, which can be used in substep b2) of step b) for further reaction of the isocyanate groups present in the polycarbodiimide and not fully reacted with the hydrophilic compounds, are on the one hand water, low molecular weight monoalcohols or alternatively diols with a molecular weight of preferably from 32 to 500, particularly preferably from 62 to 300 g/mol. Short-chained monoalcohols, that is to say branched and unbranched monoalcohols having from 1 to 30 C atoms, are more particularly preferably used, such as methanol, ethanol, propanol, 1-butanol, 1-pentanol, 1-hexanol, cyclohexanol, cyclohexylmethanol, 2-ethylhexanol, dodecanol, stearyl alcohol or oleyl alcohol, mixtures thereof with one another and mixtures of their isomers, and short-chained dialcohols having from 2 to 60 C atoms, such as 1,4-butanediol, 1,5-pentanediol, 1,6-hexanediol, cyclohexanediol, cyclohexanedimethanol, 1,8-octanediol, 1,9-nonanediol, 1,10-decanediol, 1,11-undecanediol, 1,1 2-dodecanediol, 1,13-tridecanediol, tricyclodecanedimethanol, mixtures thereof with one another and mixtures of their isomers.

The order of substeps b1) and b2) of step b) may be selected so that substep b1) can take place before substep b2), both simultaneously or in the reverse order.

The reaction in step b) is carried out at a temperature in the range of from 50 to 200° C., preferably from 100 to 170° C. and particularly preferably in the range of from 120 to 150° C. If the formation of the hydrophilized polycarbodiimide takes place very slowly, then it is possible to use a conventional urethanization catalyst.

Optionally, the aqueous dispersion of hydrophilized polycarbodiimide is adjusted in a step d) to a pH in the range of from 7 to 12 (at 23° C.), particularly preferably in the range of from 8 to 11. Amine solutions, alkalis and conventional buffer solutions may be used for this. The pH may be adjusted in step d) by adding a base selected from the group consisting of alkali metal hydroxides, ammonia and tertiary amines Lithium hydroxide, sodium hydroxide and potassium hydroxide may be mentioned as examples of alkali metal hydroxides. A trialkylamine, such as trimethylamine, and ethanolamines may be mentioned as examples of tertiary amines. In an alternative embodiment, a buffer selected from the group consisting of phosphate buffers, tris(hydroxymethyl)-aminomethane buffers and aminoalkylsulfonic acid buffers may be used to adjust the pH.

The invention furthermore provides compounds of the general Formula II, nm, preferably from 15 to 200 nm, particularly preferably from 25 to 100 nm. The median particle size d50 is the diameter above and below which 50 wt. % of the particles respectively lie. It can be determined by means of ultracentrifuging measurement (W. Scholtan, H. Lange, Kolloid. Z. and Z. Polymere 250 (1972), 782-796). The median particle sizes and particle size distributions can also be determined by light scattering methods, although these are less precise but can still correlate very well with the ultracentrifuging measurements if there are no polymodal or very wide particle size distributions.

The aqueous dispersions according to the invention are suitable in particular as a constituent of binders for coating media or impregnation media, for example for adhesives, lacquers, paints, paper coating compounds or as a binder for fibre nonwovens, i.e. in all cases in which crosslinking and an increase of the internal strength (cohesion) is desired.

Depending on the application, the aqueous dispersion may contain additives such as thickeners, flow control agents, pigments or fillers, bactericides, fungicides etc.

For use as an adhesive, besides the additives mentioned above, the aqueous dispersions according to the invention may also contain special auxiliaries and adjuvants which are conventional in adhesive technology. These include for example thickening agents, plasticisers or tackifying resins, for example natural resins or modified resins such as colophonium ester or synthetic resins such as phthalate resins.

Polymer dispersions which are used as an adhesive particularly preferably contain alkyl(meth)acrylates as main monomers in the polymer. Preferred applications in the field of adhesives are also laminating adhesives, for example for composite and glossy film lamination (adhesive bonding of transparent films to paper or cardboard). The aqueous dispersions according to the invention may be applied by conventional methods onto the substrates to be coated or impregnated.

Formula II

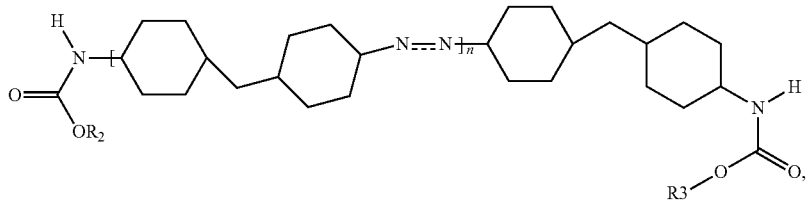

wherein $R^2$ and $R^3$, stand independently from one another for a radical derived from a compound selected from the group consisting of a monoalkoxy-poly(ethylene glycol) according to general Formula 1 with n=4 to 60, and a C1 to C30 alcohol or a C5 to C90 monoalkoxyethylene glycol. Preferred compounds of the general Formula II carry independently of one another $R^2$ and $R^3$ radicals derived from monomethoxypoly (ethylene glycol) according to general Formula 1 with n=10-20 and C1 to C30 monoalkoxyethylene glycol. The particularly preferred compound of the general Formula II carries $R^2$ and $R^3$ radicals derived independently of one another from monomethoxypoly(ethylene glycol) according to general Formula 1 with n=10-17 and monobutoxyethylene glycol.

The aqueous polycarbodiimide dispersions and/or solutions, produced by methods according to the invention, usually have a solids content of from 10 to 80 wt. %, preferably from 20 to 60 wt. %, and particularly preferably from 30 to 50 wt. %.

The median particle size d50 value of the polycarbodiimide particles dispersed in water usually lies in the range of 5-500

With the aqueous dispersions according to the invention as a constituent of binders, it is in particular possible to adhesively bond impregnate or coat articles made of wood, metal, textile, leather or plastic.

The invention will be explained in more detail with the aid of the examples described below.

EXAMPLES

Starting Materials

Cycloaliphatic Polyisocyanate H12MDI: 4,4'-diisocyanatodicyclohexylmethane, CAS-No 79103-62-1: (Desmodur®-W, Bayer MaterialScience AG, Leverkusen, DE)

Carbodiimidation Catalyst 1,1-MPO: industrial mixture of 1-methyl-2-phospholene-1-oxide and 1-methyl-3-phospholene-1-oxide, CAS-N. 872-45-7 and 930-38-1: (Clariant AG, Muttenz, CH)

Monomethoxy-poly(ethylene glycol) 750, MPEG 750: CAS-No 9004-74-4: (Aldrich, DE)

Butoxyethanol: CAS-No 111-76-2: (SysKem Chemie GmbH, Wuppertal, DE)

Analytical Determinations:

Determination of the Isocyanate Content by Titration: reaction of a weighed sample with an excess of dibutylamine and reverse titration of the excess amine with an acid were carried out. The NCO value is specified in wt. %.

Median Particle Size Determination: the dispersions or solutions were subjected to laser correlation spectroscopy (instrument: Malvern Zetasizer 1000, Malvern Inst. Limited)

Unless otherwise indicated, all the analytical determinations refer to a temperature of 23° C.

General Instructions for the Carbodiimidation Reaction (Step a)

Polyisocyanate and carbodiimidation catalyst were placed in a heatable reaction vessel (2 L glass flask and 5 L stainless steel reactor) and heated to 180° C. over 2 hours while stirring in a nitrogen flow. After 2 hours the polycarbodiimide having an average functionality of less than 1 is obtained. The nitrogen flow was then turned off and the mixture was heated over 1 hour to 200° C. while continuing to stir. Optionally, a vacuum is applied at certain time intervals by means of an oil vacuum pump, and then pressure equilibration is carried out by supplying nitrogen. The reaction profile is monitored by taking samples and subsequent titration of the NCO content (starting value for H12MDI 32 wt. %). A typical target range of the NCO content was 5.5-9.5%, corresponding to an average carbodiimidation factor of 4-7. This means that there are from 4 to 7 carbodiimide groups per polycarbodiimide molecule.

The experimental results are collated in Table 1 below:

| Example No | Catalyst amount, ppm (molar) | Catalyst amount, ppm (weight) | Controlled removal of the reaction gases | Time until NCO content <10%, hours | Final NCO content, wt. % | Time until final NCO content, hours |
|---|---|---|---|---|---|---|
| 1 (Comparison) | 450 | 200 | no | 55 | 5.9 | 100 |
| 2 | 450 | 200 | every 2 hours pressure reduction to 500 mbar, in each case for a duration of 5 minutes | 14 | 6.2 | 20 |
| 3 | 450 | 200 | permanent pressure reduction to 500 mbar | 13 | 5.2 | 30 |

Considering the prior art, e.g. the examples of EP-A 952146 which describe carbodiimidation of H12MDI at 180° C., it is found that very large amounts of about 5000 ppm (wt.) or 6800 ppm (molar) of carbodiimidation catalyst are required in order to achieve a carbodiimidation factor of 4 (i.e. an NCO value of 9.2 wt. %) after about 15 hours. Comparative Example 1 shows that a significant catalyst reduction to 200 ppm (wt.) or 450 ppm (molar) and a moderate increase of the reaction temperature by about 10% entails a significant lengthening of the reaction time: a comparable carbodiimidation factor is not found until after 55 hours of reaction. Only when process technology methods for controlled removal of the reaction gases from the reaction medium are instigated, for example pressure reduction, is the carbodiimidation reaction significantly accelerated.

Production of a Hydrophilized Polycarbodiimide (Step b) and a Polycarbodiimide Dispersion (Step c).

876 g of monomethoxypoly(ethylene glycol) 750 (MPEG 750) are placed in a 15 L stainless steel reactor and heated to 140° C. while stirring in a nitrogen atmosphere. 2748 g of the polycarbodiimide from Example 2 (NCO value of 6.2 wt. %) are added thereto. The reaction mixture is stirred further for one hour at 140° C. (NCO value of 3.3 wt. %). 376 g of butoxyethanol are then added and stirring is continued for another 1 hour (NCO value of 0 wt. %). It is then cooled to 95° C., mixed with 6000 g of water and stirred further for 1 hour. A dispersion with an almost transparent appearance is then obtained, having a pH of 9, a median particle size of 35 nm and a solids content of 40 wt. %.

The dispersion obtained is very suitable as a binder constituent for particularly well curing, low-isocyanate or entirely isocyanate-free coating and adhesive applications with improved mechanical properties, for example increased modulus level, greater tensile strength and faster hardening of the coating or the adhesive layer.

The invention claimed is:

1. A method for producing polycarbodiimide wherein, in at least one step, at least one aliphatic or cycloaliphatic polyisocyanate is converted at a temperature in the range of from 160 to 230° C. in the presence of from 50 to 700 ppm of carbodiimidation catalyst, expressed in terms of the molar amount of polyisocyanate, into a polycarbodiimide having an average functionality of from 1 to 10 carbodiimide units, wherein the reaction gases are periodically or continuously removed by applying a vacuum.

2. The method according to claim 1, comprising the steps
   a) converting at least one aliphatic or cycloaliphatic polyisocyanate at a temperature in the range of from 160 to 230° C. in the presence of from 50 to 700 ppm of carbodiimidation catalyst, expressed in terms of the molar amount of polyisocyanate, into a polycarbodiimide having an average functionality of from 1 to 10 carbodiimide units, the reaction gases being periodically or continuously removed and
   b) reacting the polycarbodiimide obtained in step a) with at least one compound selected from the group consisting of polyethoxy monools, polyethoxy diols, polyethoxypolypropoxy monools, polyethoxypolypropoxy diols, polyethoxy monoamines, polyethoxy diamines, polyethoxypolypropoxy monoamines, polyethoxypolypropoxy diamines, hydroxyalkyl sulfonates, aminoalkyl sulfonates, polyethoxy mono- and dithiols, polyethoxy-mono- and dicarboxylic acids.

3. The method according to claim 1, characterised in that the conversion of aliphatic or cycloaliphatic polyisocyanate into polycarbodiimide is carried out at a temperature in the range of from 180 to 210° C.

4. The method according to claim 1, characterised in that the conversion of aliphatic or cycloaliphatic polyisocyanate into polycarbodiimide is carried out in the presence of from 100 to 700 ppm of carbodiimidation catalyst, expressed in terms of the molar amount of polyisocyanate.

5. The method according to claim 1, characterised in that the carbodiimidation catalyst is an organophosphorus compound.

6. The method according to claim 5, characterised in that the organophosphorus compound is a phospholene oxide.

7. The method according to claim 6, characterised in that the phospholene oxide is a compound selected from the group consisting of 1-butyl-2-phospholene-1-oxide, 1-(2-ethylhexyl)-2-phospholene-1-oxide, 1-methyl-2-phospholene-1-sulfide, 1-(2-chloroethyl)-2-phospholene-1-oxide, 1-p-tolyl-2-phospholene-1-oxide, 1-1-chloromethyl-2-phospholene-1-oxide, 1,2-dimethyl-2-phospholene-1-oxide, 1-methyl-3-chloro-2-phospholene-1-oxide, 1-methyl-3-bromo-2-phospholene-1-oxide, 1-chlorophenyl-2-phospholene-1-oxide, 1,3,4-trimethyl-2-phospholene oxide, 1,2,4-trimethyl-2-phospholene-1-oxide, 1,2,2-trimethyl-2-phospholene-1-oxide, 1-phenyl-2-phospholen-1-sulfide and 1-phenyl-2,3-dimethyl-2-phospholene-1-oxide.

8. The method according to claim 2, characterised in that the reaction in step b) is carried out at a temperature in the range of from 100 to 170° C.

9. A method for producing aqueous dispersions of polycarbodiimide, comprising the steps
  a) converting at least one aliphatic or cycloaliphatic polyisocyanate at a temperature in the range of from 160 to 230° C. in the presence of from 50 to 700 ppm of carbodiimidation catalyst, expressed in terms of the molar amount of polyisocyanate, into a polycarbodiimide having an average functionality of from 1 to 10 carbodiimide units, the reaction gases being periodically or continuously removed by applying a vacuum,
  b) reacting the polycarbodiimide obtained in step a) with at least one hydrophilic compound which carries at least one group capable of reacting with isocyanate and/or carbodiimide groups to form a hydrophilized carbodiimide,
  c) dispersing the compound obtained in step b) in water and
  d) optionally adjusting the aqueous dispersions of hydrophilized polycarbodiimide obtained in step c) to a pH in the range of from 7 to 12.

10. The process of claim 9, wherein the at least one hydrophilic compound which carries at least one group capable of reacting with isocyanate and/or carbodiimide groups is selected from the group consisting of polyethoxy monools, polyethoxy dials, polyethoxypolypropoxy monools, polyethoxypolypropoxy diols, polyethoxy monoamines, polyethoxy diamines, polyethoxypolypropoxy monoamines, polyethoxypolypropoxy diamines, hydroxyalkyl sulfonates, aminoalkyl sulfonates, polyethoxy mono- and dithiols, polyethoxymono- and dicarboxylic acids, mono- and dihydroxycarboxylic acids or salts thereof.

11. The method according to claim 1, wherein the reaction gases are continuously removed.

* * * * *